United States Patent
Qawami et al.

(10) Patent No.: US 8,006,044 B2
(45) Date of Patent: Aug. 23, 2011

(54) FLEXIBLE SELECTION COMMAND FOR NON-VOLATILE MEMORY

(75) Inventors: Shekoufeh Qawami, El Dorado Hills, CA (US); Rodney R. Rozman, Placerville, CA (US); Sean S. Eilert, Penryn, CA (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 11/644,630

(22) Filed: Dec. 21, 2006

(65) Prior Publication Data

US 2008/0155204 A1 Jun. 26, 2008

(51) Int. Cl.
*G06F 12/06* (2006.01)
*G06F 13/16* (2006.01)

(52) U.S. Cl. . 711/154; 711/149; 711/169; 711/E12.001; 711/E12.078; 365/230.03

(58) Field of Classification Search ............ 711/149, 711/154, 168
See application file for complete search history.

(56) References Cited

U.S. PATENT DOCUMENTS

| | | | | |
|---|---|---|---|---|
| 4,323,965 A * | 4/1982 | Johnson et al. | ...... | 711/E12.079 |
| 5,645,068 A * | 7/1997 | Mezack et al. | ............... | 600/481 |
| 5,765,182 A * | 6/1998 | Lau et al. | ........... | 711/5 |
| 5,943,681 A * | 8/1999 | Ooishi | ......... | 711/105 |
| 5,959,929 A * | 9/1999 | Cowles et al. | ........... | 365/230.03 |
| 6,226,755 B1 * | 5/2001 | Reeves | ......... | 713/400 |
| 7,404,026 B2 * | 7/2008 | Hasan et al. | ................. | 711/115 |
| 2004/0148482 A1 * | 7/2004 | Grundy et al. | ................ | 711/167 |
| 2004/0230759 A1 * | 11/2004 | Braun et al. | ................. | 711/167 |
| 2006/0129701 A1 | 6/2006 | Qawami et al. | | |
| 2007/0165469 A1 * | 7/2007 | Rehm et al. | .................. | 365/201 |

* cited by examiner

*Primary Examiner* — Michael Krofcheck
(74) *Attorney, Agent, or Firm* — John F. Travis (57) ABSTRACT

Some embodiments of the invention pertain to a memory system containing multiple memory devices, in which one or multiple ones of the memory devices may flexibly be selected at one time for a common operation to be performed by all the selected devices concurrently.

21 Claims, 6 Drawing Sheets

| 15 | 14 | 13 | 12 | 11 | 10 | 9 | 8 | 7 | 6 | 5 | 4 | 3 | 2 | 1 | 0 | |
|----|----|----|----|----|----|---|---|---|---|---|---|---|---|---|---|---|
| | | | | | | | | | | | | | | | ▨ | 0 = 'indiv die select' mode; 1 = 'set select' mode |
| | | | | | | | | ▨ | ▨ | ▨ | ▨ | ▨ | ▨ | | | Individual die # to select (up to 64 flash die per DIMM) |
| | | | | | | | | ▨ | ▨ | ▨ | ▨ | | | | | Set # to select (up to 16 sets of 4 flash devices per DIMM) |
| | | | | | ▨ | ▨ | ▨ | | | | | | | | | DIMM # to select (up to 8 DIMMs per system) |
| ▨ | | | | ▨ | ▨ | | | | | | | | | | | Reserved |
| | | | ▨ | ▨ | | | | | | | | | | | | Select type:<br>00 = Select this 1 flash device or set<br>01 = Select all devices on DIMM<br>10 = Deselect this 1 flash device or set<br>11 = Deselect all devices on DIMM |
| | ▨ | ▨ | | | | | | | | | | | | | | Set Bit Width = 4,8,16,32 |

| Bit | Description |
|---|---|
| 0 | 0 = 'indiv die select' mode; 1 = 'set select' mode |
| 1-6 | Individual die # to select (up to 64 flash die per DIMM) |
| 1-4 | Set # to select (up to 16 sets of 4 flash devices per DIMM) |
| 7-9 | DIMM # to select (up to 8 DIMMs per system) |
| 10 | Reserved |
| 11-12 | Select type:<br>00 = Select this 1 flash device or set<br>01 = Select all devices on DIMM<br>10 = Deselect this 1 flash device or set<br>11 = Deselect all devices on DIMM |
| 13-14 | Set Bit Width = 4,8,16,32 |
| 15 | |

FLEXIBLE SELECTION COMMAND FOR NON-VOLATILE MEMORY

To improve the bandwidth of NAND flash memory without adding major costs to the device, or to get higher density NAND flash memory system, multiple memory devices many be associated together in various sizes of groupings. Several memory devices may be grouped into a set, while multiple sets may be grouped into a memory module. Sometimes the same operation (e.g., go into sleep mode.) is to be performed by all the devices in a group. However, conventional systems must select and instruct each device separately, even if many devices are supposed to perform the same operation at the same time. This adds to the overhead of operating the memory system.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Some embodiments of the invention may pertain to a memory system containing multiple memory devices, in which one, or multiple ones, of the memory devices may be selected at one time for a common operation to be performed concurrently by all the selected memory devices. The selection scheme may include a selection command that permits simultaneous selection of one or multiple memory devices, with the multiple selection being at various levels of grouping. A similar command may permit simultaneously deselecting one or multiple memory devices. In some embodiments, configuration information may also be conveyed to all selected memory devices with the selection command.

Figure 1:
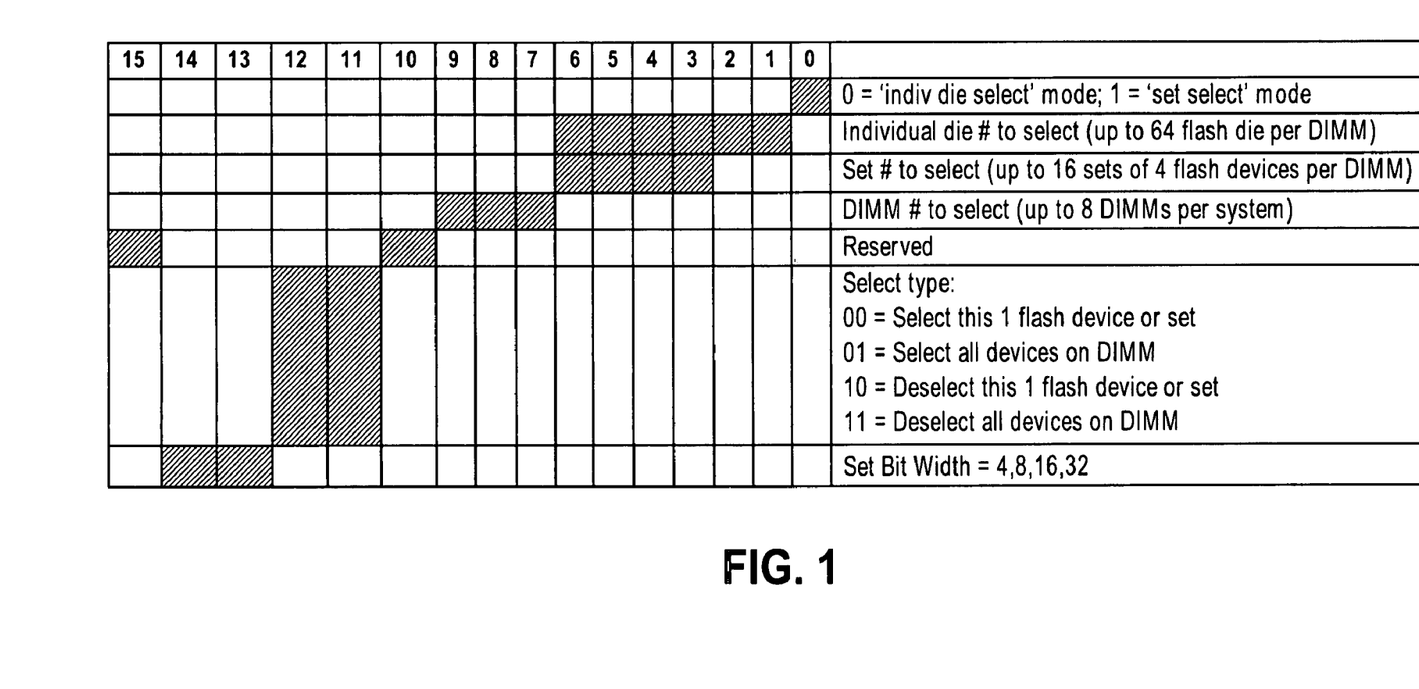
FIG. 1 shows a chart of a selection command, according to an embodiment of the invention.

FIG. 1 shows a chart of a selection command, according to an embodiment of the invention. The illustrated embodiment is for a bus with a 16-bit width, but other embodiments may use other bit widths. This embodiment also assigns certain functions to certain bit positions, but other embodiments may make different assignments. The embodiment of FIG. 1 will be described here, but these particular designations should not be seen as a limitation on the scope of the invention. Once a selection command has been issued by a memory controller to specify a particular memory device or group of memory devices, an operation command may be issued by the memory controller to specify what operation the selected memory device(s) are to perform. (Note: the chart labels each memory device as a 'flash die', but this is only one way in which a memory device may be implemented. Each memory device may be implemented as a die, an integrated circuit, an IC package, or any other feasible packaging scheme.

In FIG. 1, a memory system is implied which may contain up to 8 dual inline memory modules (DIMMs), with each DIMM containing up to 16 sets, with each set containing up to 4 individual memory devices, for a total of 64 memory devices per DIMM and 512 memory devices per system. (Note: although a DIMM is described here and in other parts of this document as an example, other 'blocks' of multiple memory devices may also be used.) In FIG. 1, bit positions 6-1 define a 6-bit 'device' field in which any one of 64 memory devices may be individually selected for a memory operation of some kind. Alternatively, bit positions 6-3 define a 4-bit 'set' field in which any one of 16 sets may be selected. When a set is selected, all four of the memory devices within that set are being simultaneously selected. Since the device field and set field overlap, bit position 0 may be used to specify whether the affected bit positions should be read as a set selection or as an individual device selection.

Bit positions 9-7 represent a 3-bit 'DIMM' field that may be used to select one particular DIMM out of 8 possible DIMMs. By using bits 9-0, it is therefore possible to specify a particular individual memory device, or 4-device set of memory devices, within a particular DIMM. Thus, the illustrated embodiment may permit selection of any memory device, or any set of memory devices, in a system containing up to 512 memory devices.

Bit positions 12-11 may be used to provide other selection choices. In the indicated convention, a value of 00 in these two bit positions may indicate selection of only one memory device (or only one set, depending on the value of bit position 0) in the specified DIMM, while a 01 may indicate simultaneous selection of all the memory devices in the specified DIMM. If all devices in the DIMM are indicated, bit positions 6-0 may be ignored. In a similar way, bit positions 12-11 may indicate deselection of a particular memory device or set, or deselection of all memory devices in the DIMM. Deselection may serve various purposes. For example, it may be used to further refine the selection process. If a first command selects a particular set, and a following command deselects one device within that set, then only three of the four devices in that set will remain selected and will perform the operation indicated by a subsequent operation command. Alternatively, a deselection may be used to reset a device that was previously selected, and remains selected even though it should not be.

The selection command may also be used to provide configuration information to the selected devices, without the need for a subsequent command to impart that information. In the example shown, bit positions 14-13 may define a 'configuration' field which, in this case, indicates a bit width that the selected devices are to use for data transfers. Using two bits for this field permits selection of up to 4 different bit widths. Though four particular bit widths are shown, any suitable bit widths may be represented by various possible combinations in this field. This command might be used, for example, to set the bit width of all the memory devices in a DIMM with a single command.

Two bit positions, positions 10 and 15, are unused in this example and may be reserved for future use. Although particular fields and field widths have been shown, other embodiments may use other techniques.

Figure 2:
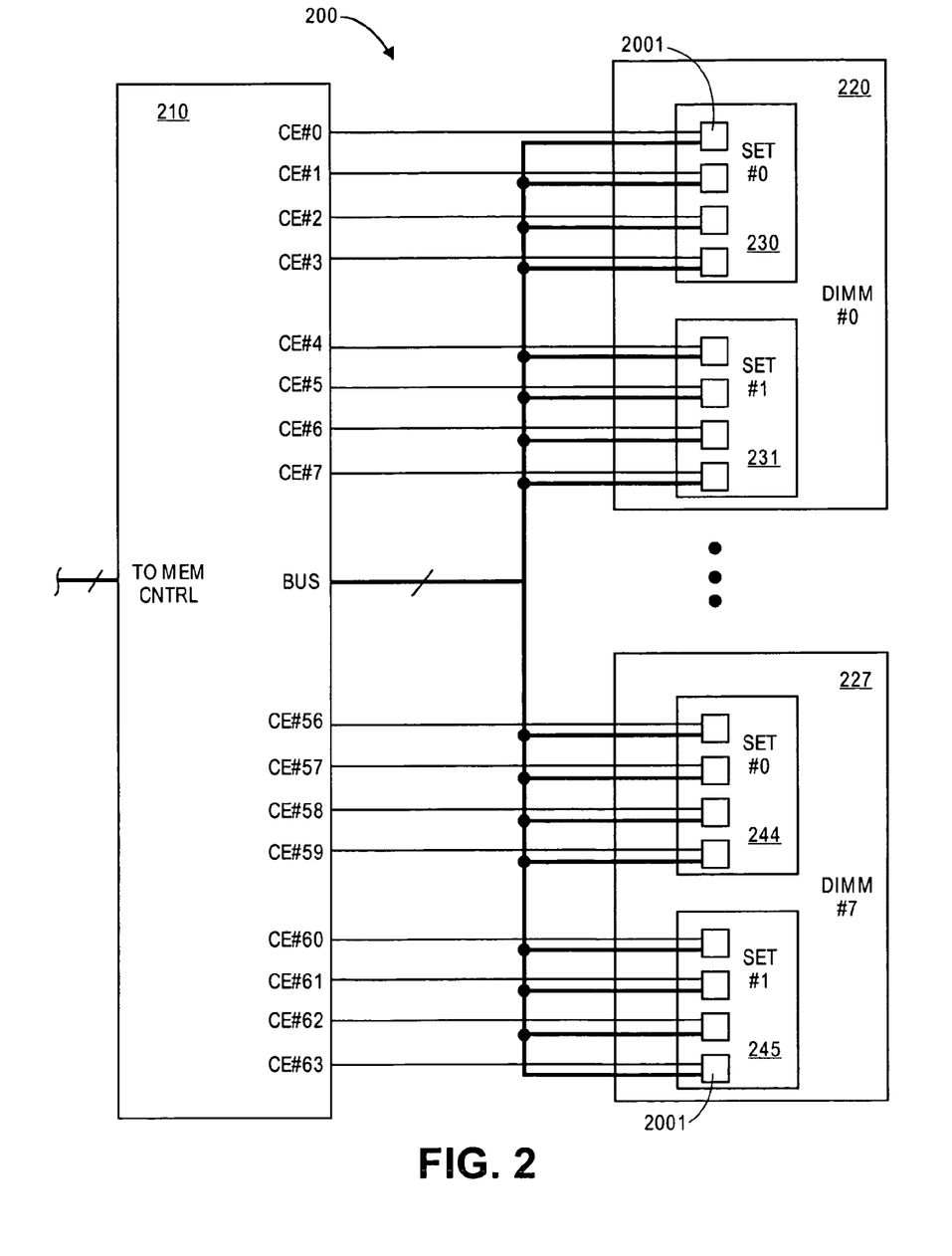
FIG. 2 shows a diagram of a memory sub-system, according to an embodiment of the invention.

FIG. 2 shows a diagram of memory sub-system, according to an embodiment of the invention. In some embodiments, the memory devices may be non-volatile memory devices, for example flash memory devices. In some embodiments, the non-volatile memory devices may be NAND flash memory devices. Since it is not feasible here to show a sub-system containing all 512 memory devices permitted by the command format of FIG. 1, the memory system 200 illustrated in FIG. 2 shows only the first and last of eight DIMMs, with each DIMM (220, 227) containing two sets (230, 231 in DIMM #0 and 244, 245 in DIMM #7) of four memory devices each. The memory devices are all labeled 2001, indicating for this example that they may all be identical devices except for their location and connections in the system.

In memory system 200, selection logic 210 may receive a command from a memory controller, such as one of the commands defined in FIG. 1, and select the memory devices indicated in the command for performing a subsequent operation. Selection of each memory device may be accomplished in various ways. In this example, a separate Chip Enable (CE) line to each memory device may be used. Multiple CE lines may be activated if the selection command indicated that multiple memory devices were to be selected. A signal asserted on a CE line may cause the selected memory device to activate its interface so that it will perform any operations indicated on the common bus lines. If multiple memory devices are selected, they may all receive the same operation command, and possibly the same data, at the same time, and perform the same operations in response to that operation command and data. Although the illustrated example shows a CE line to each memory device that can select the device for operation, other techniques may also be used. For example, each memory device may have selection straps connected to the pins of the device, so that when a given selection address is placed on the bus, the selected device will recognize that address and will become activated. Other techniques may also be used to activate the selected device(s).

Figure 3:
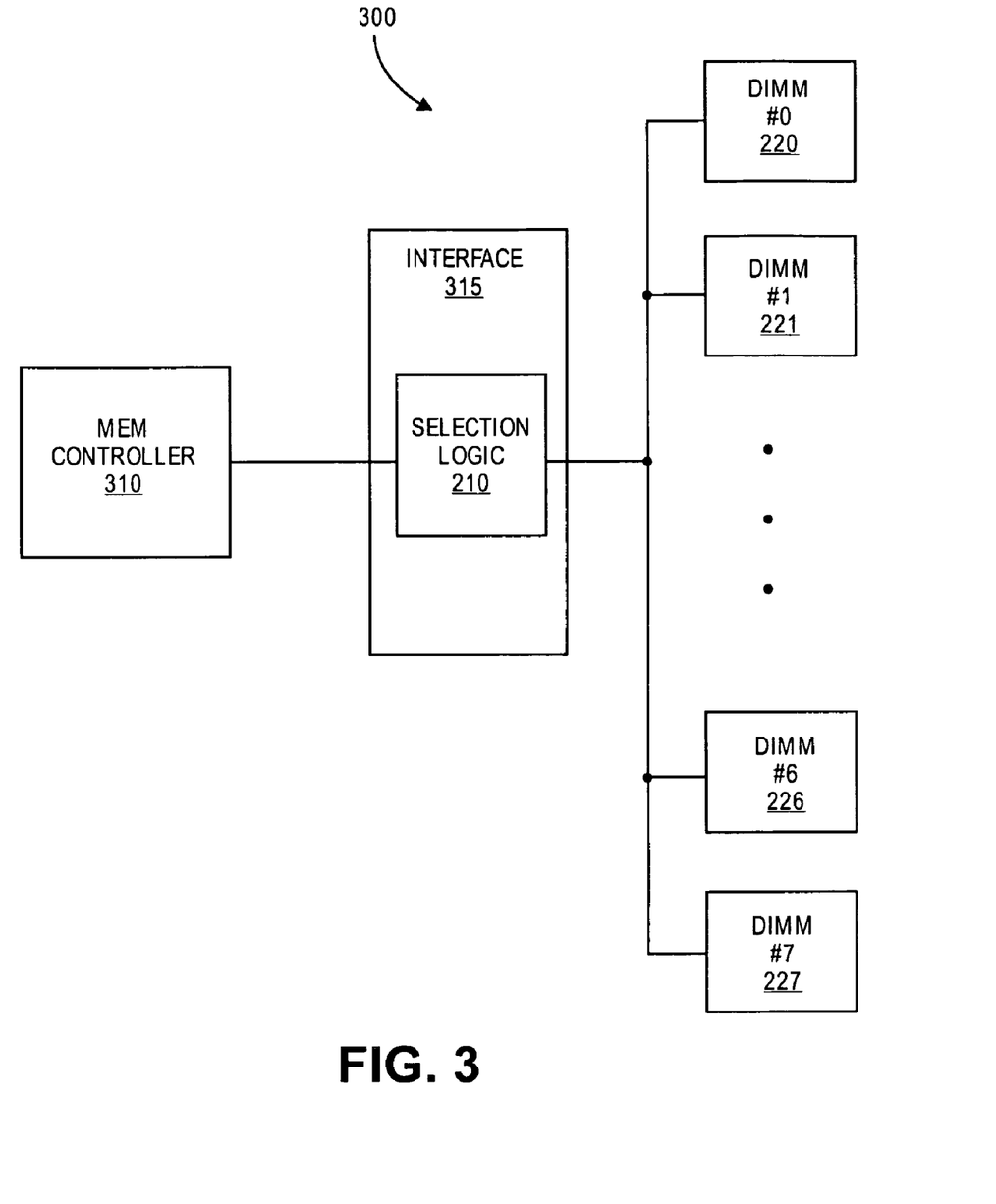
FIG. 3 shows a diagram of a memory system, according to an embodiment of the invention.

FIG. 3 shows a diagram of memory system, according to an embodiment of the invention. DIMMs 220-227 may be similar to those previously described. Selection logic 210 may be part of a larger interface 315, through which memory controller 310 may control and communicate with the memory devices on the DIMMs. The memory bus between the memory controller 310 and interface 315 may take various forms, such as that illustrated in FIG. 4.

Figure 4:
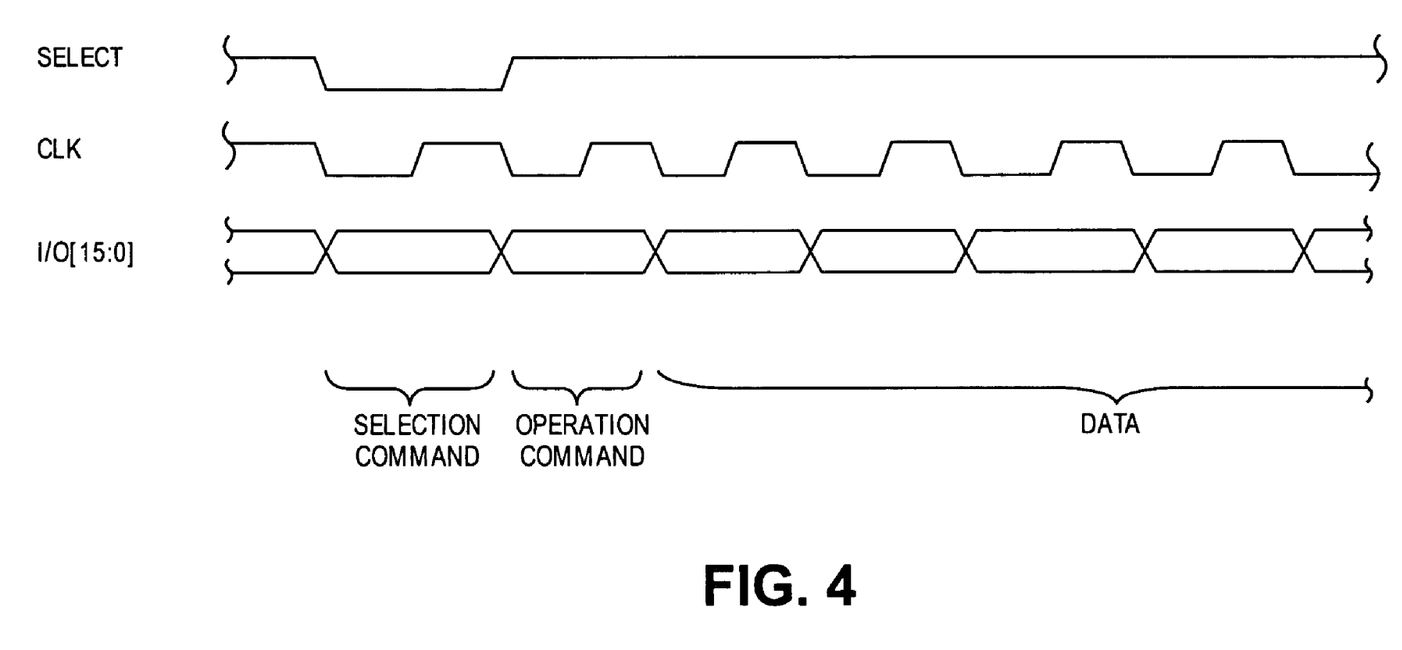
FIG. 4 shows a timing diagram of signals on a memory bus, according to an embodiment of the invention.

FIG. 4 shows a timing diagram of signals on a memory bus, according to an embodiment of the invention. In the illustrated embodiment, input-output (I/O) lines 15-0 may be used to sequentially convey a selection command, an operation command, and other data necessary for the completion of the command sequence. A timing signal CLK may be used to provide timing synchronization for the signals that are on the I/O lines. The first command may be a selection command, and in some embodiments may follow the format described in FIG. 1. A SELECT signal may be used to indicate that this is a selection command. The next command following the selection command may be assumed to be an operation command. The meaning of the subsequent data signals on the I/O lines may vary depending on what operation was specified by the operation command. Other lines carrying other signals (not shown) may also be contained in the memory bus as needed. Although FIG. 4 shows a single data rate (SDR) technique, where only one edge of the clock signal is used to latch the data, other embodiments may use other techniques. For example, a double date rate (DDR) technique may be used, in which both the rising and falling edges of the clock signal are used to latch data. Other clocking techniques may also be used.

Figure 5:
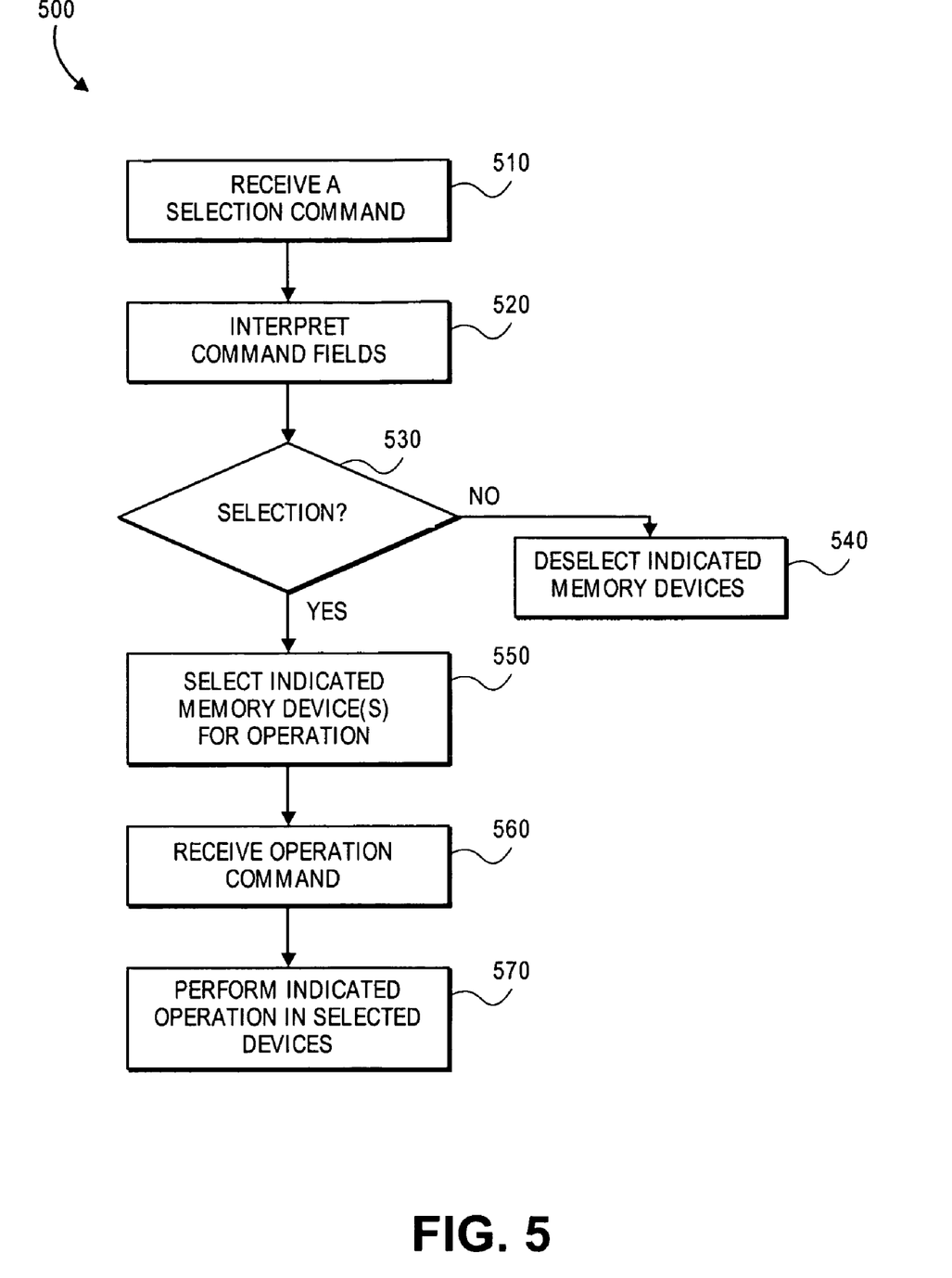
FIG. 5 shows a flow diagram of a method of interpreting a memory command, according to an embodiment of the invention.

FIG. 5 shows a flow diagram of a method used in interpreting a memory command, according to an embodiment of the invention. In the illustrated flow diagram 500, the selection logic of a memory system may receive a selection command from a memory controller at 510. The selection logic may interpret the command at 520. In some embodiments, the selection format may be like, or similar to, the flexible format described in FIG. 1, permitting a single memory device, or a group of memory devices, to be selected. If permitted by the selection format, the size of the group being selected may also be selectable.

If the command is actually a command to deselect rather than select, as determined at 530, then the indicated memory devices may be deselected at 540, through whatever mechanism has been provided for deselection. However, if the command is a command to select, as determined at 530, then the memory devices indicated by the command may be selected at 550. Once the memory devices are selected, an operation command may be received at 560, and the selected memory devices may perform the indicated operation at 570.

Figure 6:
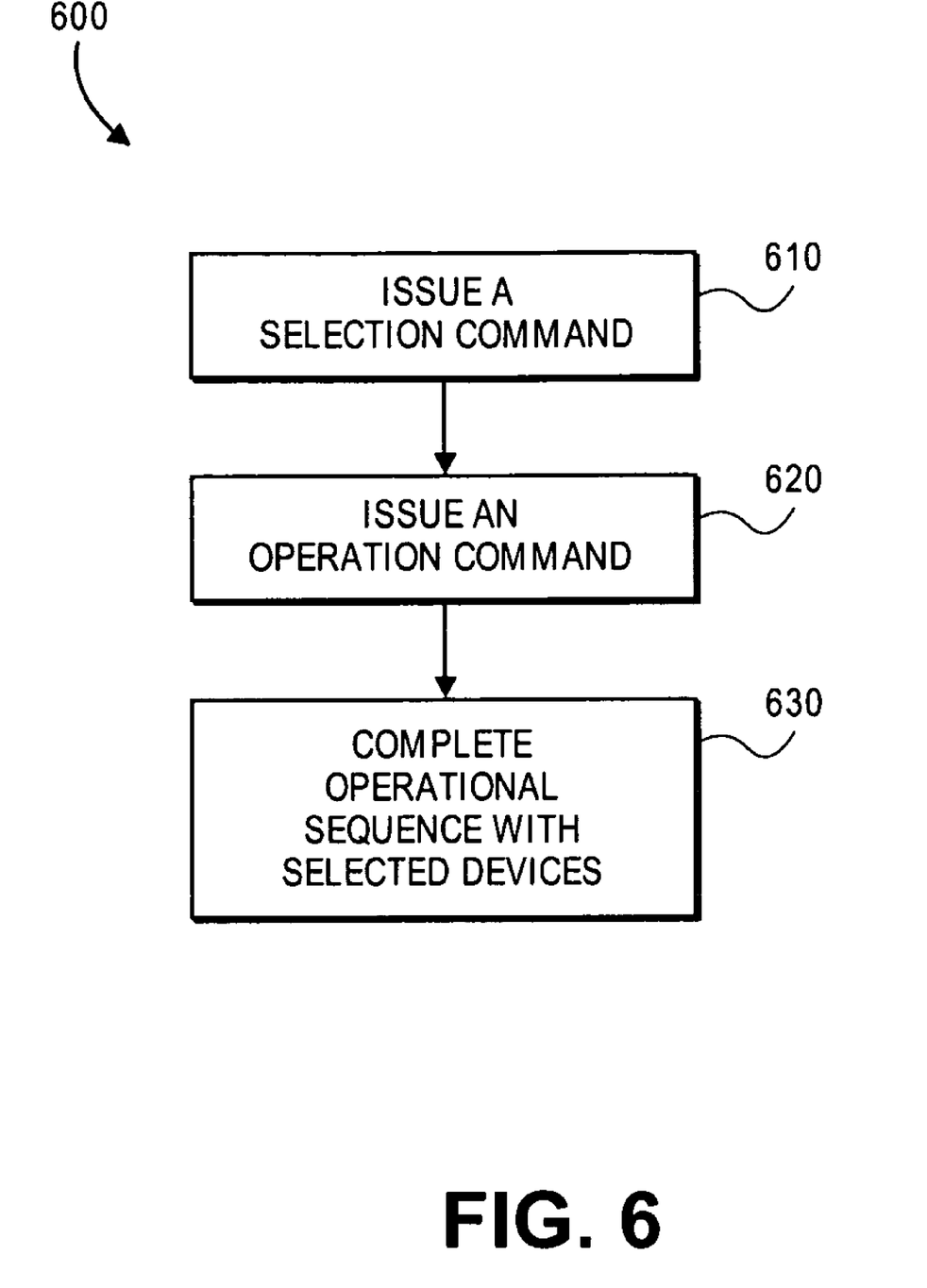
FIG. 6 shows a flow diagram of a method of issuing a memory command, according to an embodiment of the invention.

FIG. 6 shows a flow diagram of a method used in issuing a memory command, according to an embodiment of the invention. In the illustrated flow diagram 600, a memory controller may issue a selection command at 610. In some embodiments, the selection format may be like, or similar to, the flexible format described in FIG. 1, permitting a single memory device, or a group of memory devices, to be selected. If permitted by the selection format, the size of the group being selected may also be selectable. Once the desired memory devices have been indicated by a selection command, an operation command may be issued at 620, directing the selected memory devices to perform that operation. Depending on the specifics of the indicated operation, the memory controller may need to perform other operations at 630 to complete the operational sequence.

The practice of selecting multiple memory devices at the same time may be advantageous in various ways. For example, multiple memory devices may be instructed to perform an erase operation at the same time, or may be instructed to enter a non-operational low-power mode at the same time, simply by issuing a single command sequence that begins by simultaneously selecting all the indicated memory devices. In other operations, multiple memory devices may be simultaneously instructed to read a page of data from the same address block of their internal arrays, and place that data into an internal buffer, from where a memory controller can read each device's buffer sequentially. In still other operations, multiple memory devices may be instructed to write the same information into their arrays at the same time.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:
an interface to be coupled between a memory controller and multiple memory devices;
wherein the interface is to recognize a first command from the memory controller selecting a particular one of the multiple memory devices for a memory operation and is to select the particular one of the multiple memory devices for the memory operation;
wherein the interface is to recognize a second command from the memory controller selecting multiple ones of the multiple memory devices for the memory operation and is to select the multiple ones of the multiple memory devices for the memory operation;
wherein the second command is to contain multiple bits presented simultaneously on a memory bus, with a first group of the multiple bits indicating a dual inline memory module number and a second group of the multiple bits indicating a set number.

2. The apparatus of claim 1, further comprising the multiple memory devices coupled to the interface.

3. The apparatus of claim 2, further comprising a separate selection line coupled between the interface and each of the multiple memory devices.

4. The apparatus of claim 2, wherein each of the multiple memory devices is contained in a separate integrated circuit.

5. The apparatus of claim 1, wherein:
the interface is further to recognize a third command deselecting the particular one of the multiple memory devices; and
the interface is further to recognize a fourth command deselecting the multiple ones of the multiple memory devices.

6. The apparatus of claim 1, further comprising:
a memory bus coupled to the interface; and
the memory controller coupled to the interface through the memory bus.

7. The apparatus of claim 1, wherein the interface is to recognize a portion of at least one of the first and second commands that specifies a configuration setting for the selected memory device(s).

8. The apparatus of claim 7, wherein the configuration setting indicates a bit width.

9. The apparatus of claim 1, wherein the interface is to recognize fields in the second command that indicate:
selection of a particular set of the memory devices; and
selection of a particular block of multiple ones of the sets.

10. The apparatus of claim 9, wherein the particular block is the dual inline memory module.

11. A method, comprising
receiving a first command from a memory controller;
interpreting a first field in the first command to select, for a subsequent operation, either 1) a single memory die, or 2) a single set of multiple memory dice; and
interpreting a second field in the first command to select, for the subsequent operation, a particular die if the first field indicates the single memory die, and a particular set if the first field indicates the single set of multiple memory dice;
wherein the first and second fields are presented on a memory bus simultaneously;
wherein bits in the second field indicating the particular set are a subset of bits in the second field indicating the particular die.

12. The method of claim 11, further comprising:
receiving a second command from the memory controller, the second command indicating an operation; and
performing the operation in the selected memory device(s).

13. The method of claim 11, further comprising setting a configuration in the selected memory device(s), based on contents of a particular field in the first command.

14. A method, comprising
issuing a first command to a memory system containing multiple memory devices, the first command comprising:
a first field that can indicate selection of either a single memory device or a set of multiple memory devices; and
a second field that can indicate which particular device or set of devices is being selected;
wherein the first and second fields are presented simultaneously on a memory bus;
wherein bits in the second field indicating the particular set of devices are a subset of bits in the second field indicating the particular device.

15. The method of claim 14, wherein the first command further comprises a third field that can indicate selection of a single block out of multiple blocks, each block containing multiple ones of the sets.

16. The method of claim 14, further comprising issuing a second command to the memory system, the second command to indicate an operation to be performed by the memory device(s) selected by the first command.

17. The method of claim 14, wherein the first command includes a fourth field indicating whether the selected memory device(s) are:
1) being selected for a subsequently specified operation; or
2) are being deselected for further operation until being subsequently selected.

18. An article comprising
a tangible non-transitory machine-readable storage medium that contains instructions, which when executed by one or more processors result in performing operations comprising:

issuing a first command to a memory system containing multiple memory devices, the first command comprising:

a first field to indicate whether a single one or a single set of multiple ones of the memory devices are being selected; and a second field to indicate which particular device or set of devices is being selected;

wherein the first and second fields are presented simultaneously on a memory bus;

wherein bits in the second field indicating the particular set of devices are a subset of bits in the second field indicating the particular device.

19. The article of claim 18, wherein the first command further comprises a third field that can indicate selection of a single block out of multiple blocks, each block containing multiple ones of the sets.

20. The article of claim 18, wherein the operations further comprise issuing a second command to the memory system, the second command to indicate an operation to be performed by the memory device(s) selected by the first command.

21. The method of claim 18, wherein the first command includes a fourth field indicating whether the selected memory device(s) are:

1) being selected for a subsequently specified operation; or
2) are being deselected for further operation until being subsequently selected.

* * * * *